(12) United States Patent
Chen et al.

(10) Patent No.: US 7,780,319 B2
(45) Date of Patent: Aug. 24, 2010

(54) COMPUTER PANEL WITH LIGHT-ADJUSTING MECHANISM

(75) Inventors: Yun-Lung Chen, Taipei Hsien (TW); Jian Hu, Shenzhen (CN); Qing-Hao Wu, Shenzhen (CN); Xian-Huang Gao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 266 days.

(21) Appl. No.: 11/782,657

(22) Filed: Jul. 25, 2007

(65) Prior Publication Data
US 2008/0218994 A1 Sep. 11, 2008

(30) Foreign Application Priority Data
Mar. 6, 2007 (CN) .......................... 2007 2 0200120

(51) Int. Cl.
*F21V 23/04* (2006.01)

(52) U.S. Cl. .......................... 362/394; 200/18; 345/166

(58) Field of Classification Search ...................... 362/4, 362/28, 29, 30, 85, 86, 240, 241, 247, 251, 362/276, 394, 612, 613, 630, 631, 555, 482, 362/489, 519, 545, 800, 802; 200/18
See application file for complete search history.

(56) References Cited

U.S. PATENT DOCUMENTS

| | | | | |
|---|---|---|---|---|
| 5,023,522 A * | 6/1991 | Mansour | ...................... | 315/291 |
| 5,359,231 A * | 10/1994 | Flowers et al. | .............. | 307/125 |
| 5,637,930 A * | 6/1997 | Rowen et al. | ................ | 307/112 |
| 5,808,417 A * | 9/1998 | Ference et al. | .............. | 315/112 |
| 5,912,661 A * | 6/1999 | Siddiqui | ...................... | 345/166 |
| 6,014,130 A * | 1/2000 | Yung-Chou | .................. | 345/163 |
| 6,045,232 A * | 4/2000 | Buckmaster | .................. | 362/20 |
| 6,187,394 B1 * | 2/2001 | Johnson et al. | .............. | 428/13 |
| 6,388,212 B1 * | 5/2002 | Ishihara et al. | ................ | 200/18 |
| 6,400,284 B2 * | 6/2002 | Wu | ............................ | 341/20 |
| 7,054,233 B2 * | 5/2006 | Kibiloski et al. | ............. | 368/67 |
| 7,205,977 B2 * | 4/2007 | Ledbetter et al. | ............ | 345/156 |
| 7,528,331 B2 * | 5/2009 | Bricaud et al. | ................ | 200/18 |
| 2007/0176714 A1 * | 8/2007 | Potempa et al. | ................ | 335/1 |

* cited by examiner

*Primary Examiner*—Hargobind S Sawhney
(74) *Attorney, Agent, or Firm*—Frank R. Niranjan

(57) ABSTRACT

A panel assembly includes a panel (10) having a light-pervious area (142), a light source (60) attached on the panel for lighting the light-pervious area, a variable resistor (30) electrically connected in series with the light source, and a rotating member (40) rotatably attached on the panel, the rotating member is engagingly coupled to the variable resistor and is manually rotatable in a manner that a resistance of the variable resistor is adjusted accordingly.

17 Claims, 7 Drawing Sheets

US 7,780,319 B2

COMPUTER PANEL WITH LIGHT-ADJUSTING MECHANISM

BACKGROUND

1. Technical Invention

The present invention relates to computer panels of computer systems, and more particularly to a computer panel with a light-adjusting mechanism.

2. General Background

Usually, a light source, such as a light-emitting diode, is installed on a front panel of a computer system, in order to display the working state of the computer system. Generally, a light-pervious switch button is positioned on the front panel. When the switch button is pushed to press an electrical switch, the power supply switches on and the light source emits light, and the switch button is illuminated. However, in conventional computer systems, one light source corresponds to only one switch button. If another switch button or light-pervious member needs illumination, additional light-emitting diodes should be provided. In addition, the light-emitting diode as a spot light source, lights only a limited area.

Another conventional apparatus is provided for illuminating more light-pervious members and enlarging the lit area of the light source, which includes an arcuate flat light-reflecting member mounted on a computer panel. The light-reflecting member includes a light incident surface, a light-guiding portion, and a light-showing portion. A bracket is disposed above the light incident surface for receiving a light source. Rays emitted by the light source are reflected by the light-guiding portion, and illuminate a larger area of the computer panel via the light-showing portion. However, the light of the computer panel cannot be adjusted when users don't want to see the light while the computer is running.

What is needed, therefore, is a computer panel with a light-adjusting mechanism adjusting brightness of the light source when so desired.

SUMMARY

A panel assembly includes a panel having a light-pervious area, a light source attached on the panel for lighting the light-pervious area, a variable resistor electrically connected in series with the light source, and a rotating member rotatably attached on the panel, the rotating member is engagingly coupled to the variable resistor and is manually rotatable in a manner that a resistance of the variable resistor is adjusted accordingly.

Other advantages and novel features will be drawn from the following detailed description of preferred embodiments with attached drawings, in which:

DETAILED DESCRIPTION OF PREFERRED EMBODIMENTS

Figure 1:
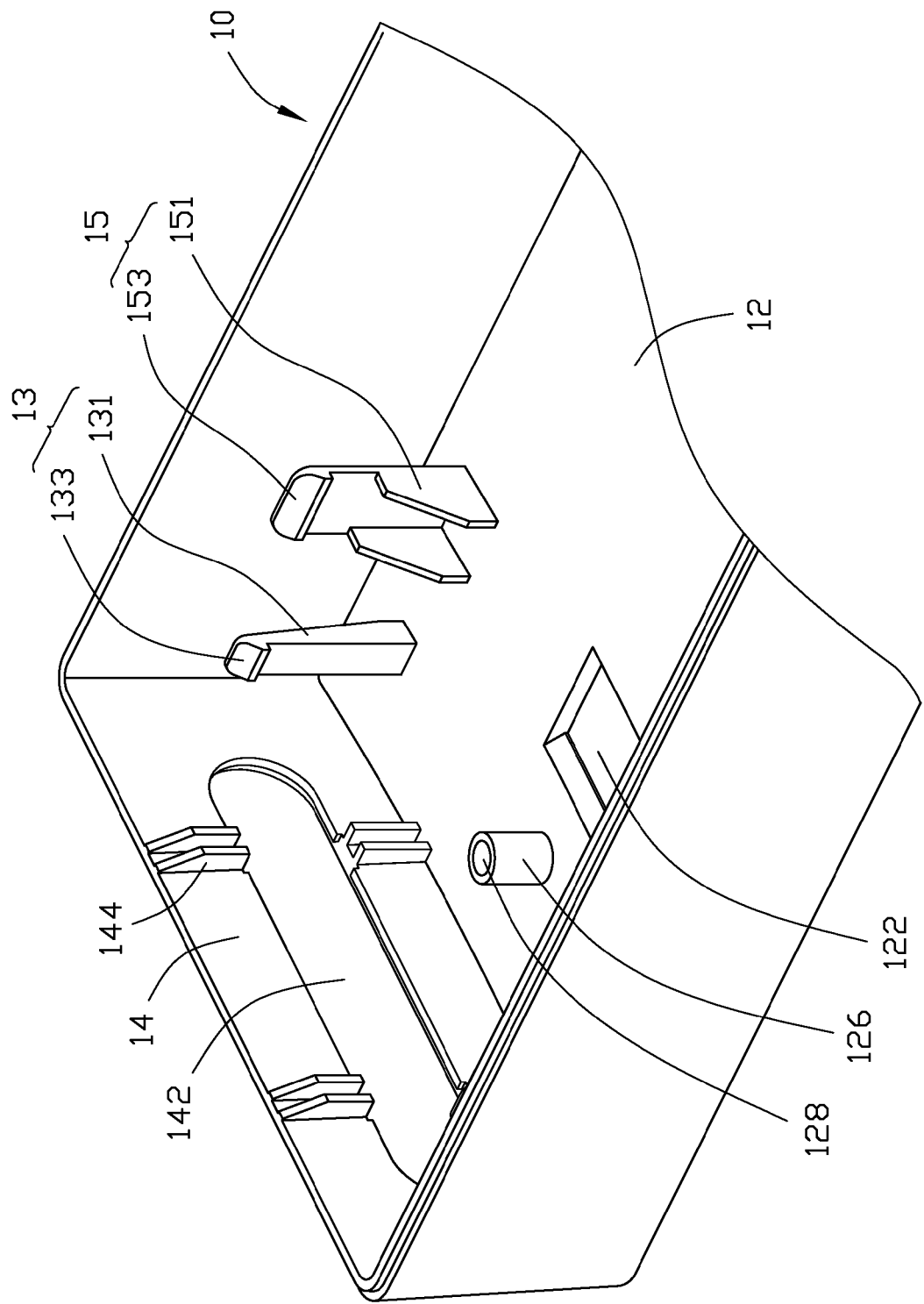
FIG. 1 is an isometric partial view of a computer panel with a light-adjusting mechanism in accordance with a preferred embodiment of the present invention, including a computer panel.
Figure 2:
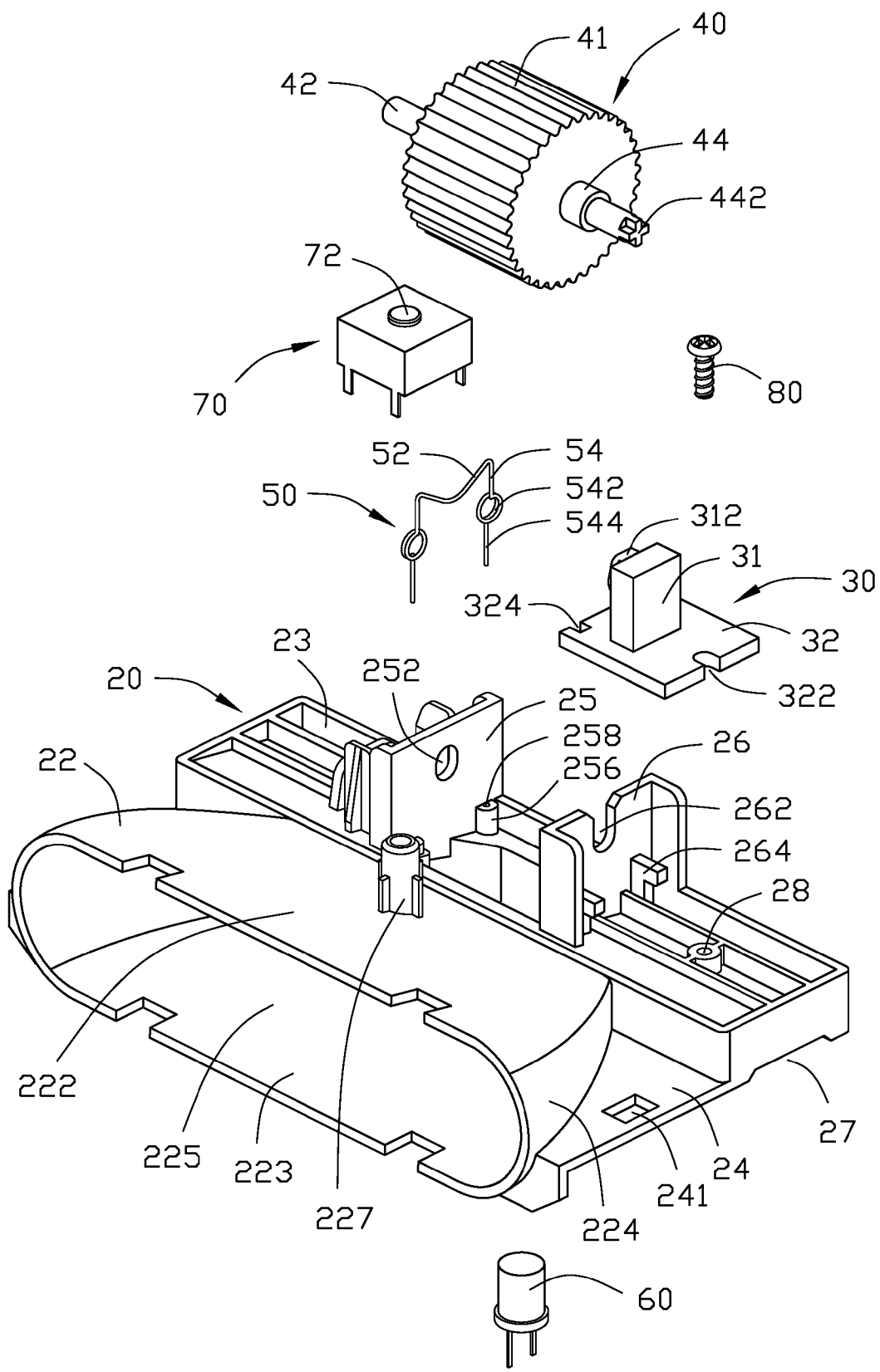
FIG. 2 is an exploded, isometric view of the light-adjusting mechanism of FIG. 1, including a light-reflecting member, a rotating member, a variable resistor, a switch module, an elastic member, and a light source.

Referring to FIGS. 1 and 2, a computer panel with a light-adjusting mechanism in accordance with a preferred embodiment of the present invention, includes a computer panel 10, a light-reflecting member 20, a variable resistor 30, a rotating member 40, an elastic member 50, a light source 60, and a switch module 70.

The computer panel 10 includes a base 12, and a bent plate 14 generally perpendicular to the base 12. Two pairs of elongated hooks 13, 15 protrude from the inner surface of the base 12. Each elongated hook 13 includes a supporting portion 131 and a clasp 133 protruding from a free end of the supporting portion 131. Each elongated hook 15 includes a supporting portion 151 and a clasp 153 protruding from a free end of the supporting portion 151. A quadrate receiving hole 122 is defined in the base 12 between the elongated hooks 13, 15. A positioning post 126 with a positioning hole 128 defined therein protrudes from the base 12 nearby the receiving hole 122, between the elongated hooks 13, 15. A pair of parallel guiding protrusions 144, each with a slot defined therein, is formed on an inner surface of the bent plate 14, and extends along a direction perpendicular to the base 12. A generally ellipse-shaped through opening is defined in the bent plate 14, and extends along a direction perpendicular to the guiding protrusions 144. A light-pervious area, such as a generally ellipse-shaped transparent board 142, is fitted into the through opening by engaging with the slots of the guiding protrusions 144.

The light-reflecting member 20 is configured to be disposed on the inner surface of the base 12 of the computer panel 10, for reflecting rays of the light source 60, and enlarging an illuminated area. The light source 60 may, for example, be a light-emitting diode. The light-reflecting member 20 has a hollow body 22 and a securing portion 23 extending from a rear end of the hollow body 22. The hollow body 22 includes a semicircular top wall 222, a semicircular bottom wall 223 parallel to the top wall 222, and a generally embowed sidewall 224. A generally rectangular through opening 225 for light passing through, is defined by adjacent edges of the top wall 222, the bottom wall 223, and the sidewall 224. A pair of extending clips 24 protrudes from the sidewall 224 at opposite sides respectively. Each extending clip 24 defines a locking hole 241 therein, for receiving the corresponding clasp 133 of the elongated hook 13. A mounting post 227 having a plurality of supporting poles (not labeled) extending therearound, protrudes from the bottom wall 223 of the light-reflecting member 30, for engaging in the positioning hole 128 of the positioning post 126 of the computer panel 10. A through hole (not shown) is defined at a rear end of the light-reflecting member 20, and through the top wall 222 and the bottom wall 223 thereof, for accommodating the light source 60.

A pair of tabs 25, 26 protrudes from the securing portion 23 of the light-reflecting member 20. An ellipse-shaped pivoting hole 252 is defined in the tab 25. A U-shaped opening 262 corresponding to the pivoting hole 252 is defined in the tab 26. A pair of positioning posts 256 protrudes from a surface of the tab 25 close to the tab 26 at opposite sides of the tab 25. Each positioning post 256 defines a positioning hole 258 therein for positioning the elastic member 50. The elastic member 50 includes a V-shaped supporting portion 52 and a pair of positioning portions 54 extending from opposite ends of the supporting portion 52 respectively. Each positioning portion 54 includes a circular portion 542 and an inserting portion 544 for insertion into the positioning hole 258 of the corresponding securing post 256. A pair of hooks (not labeled) protrudes from the securing portion 23 close to another surface of the tab 25, for securing the switch module 70. A pair of L-shaped protrusions 264 protrudes from the securing portion 23 close to a surface of the tab 26 far away from the tab 25. A screw hole 28 is defined in the securing portion 23 near to the pair of protrusions 264. A pair of locking openings 27 are defined on the securing portion 23 at two opposite sides thereof, for receiving the corresponding clasp 153 of the elongated hook 15 respectively.

The rotating member 40 includes a rotating body 41. Two pivots 42, 44 protrude from the rotating body 41 at opposite sides thereof respectively. Each pivot 42, 44 includes a greater portion, and a smaller portion extending from the greater portion. The smaller portions are used for inserting into the pivoting hole 252 of the tab 25 and the U-shaped opening 262 of the tab 26 respectively. A crosshead 442 is formed at a distal end of the small portion of the pivot 44.

Figure 3:
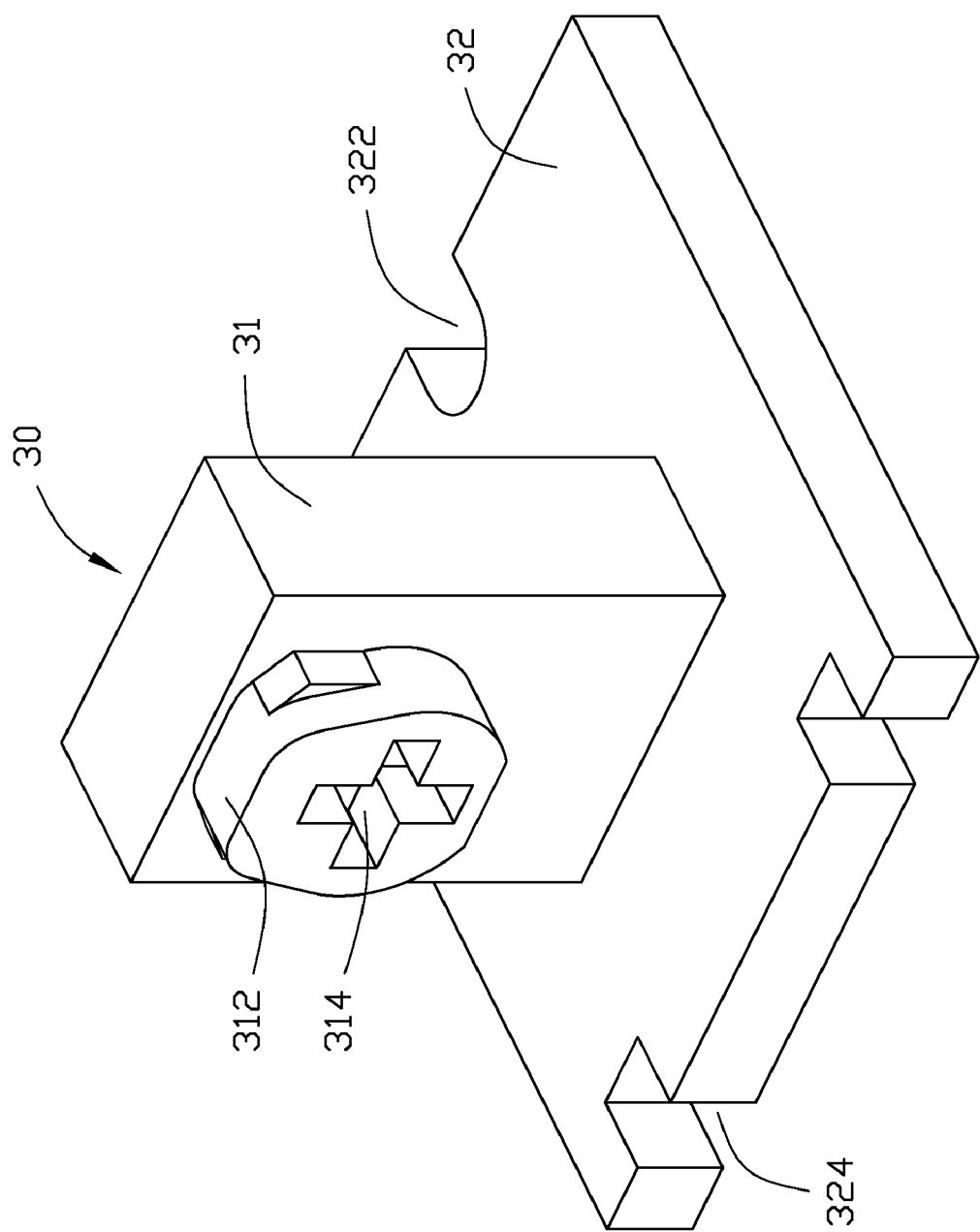
FIG. 3 is an enlarged isometric view of the variable resistor of FIG. 2.
Figure 4:
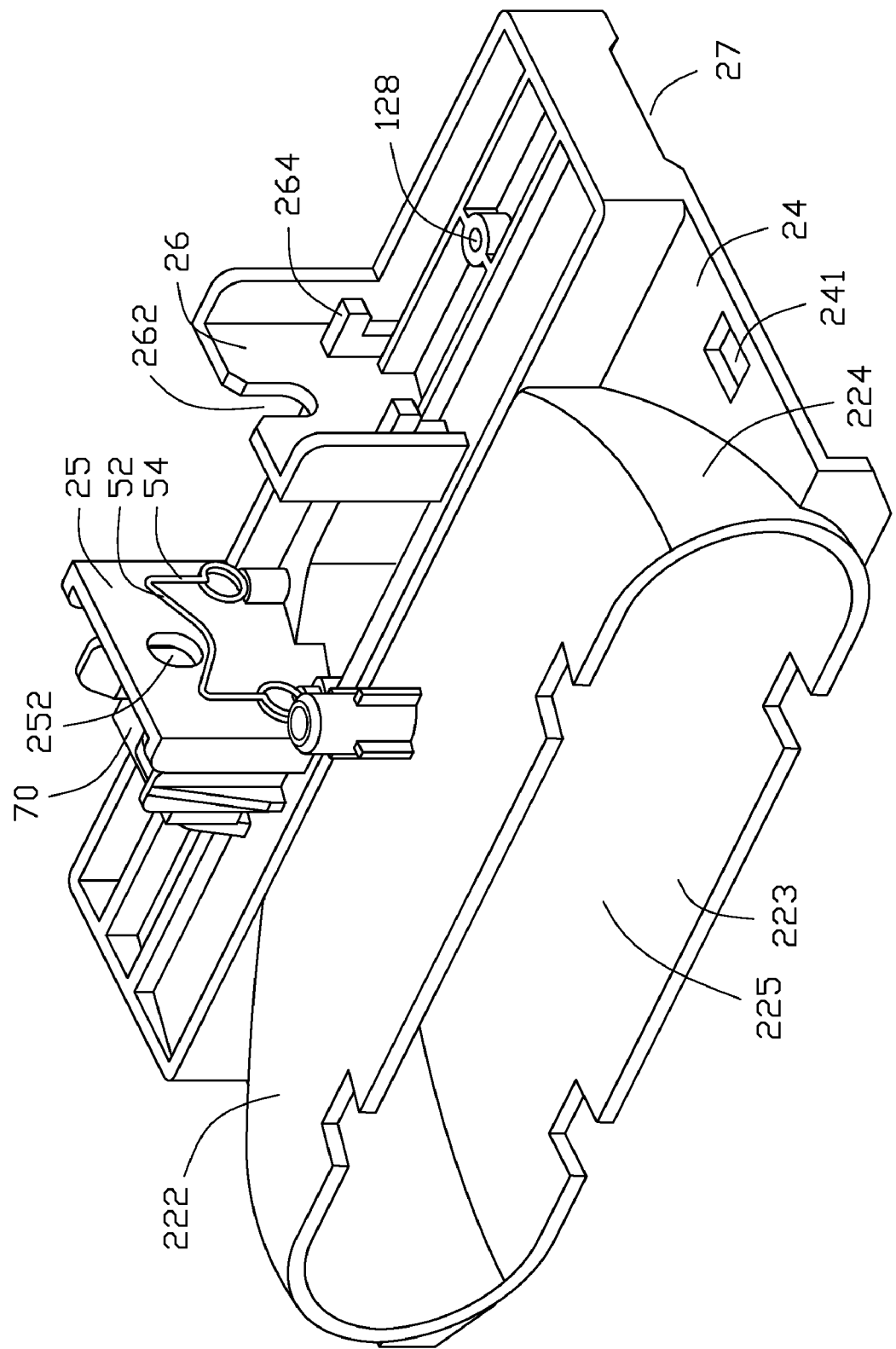
FIG. 4 is an assembled view of the switch module, the elastic member, and the light-reflecting member of FIG. 2.
Figure 5:
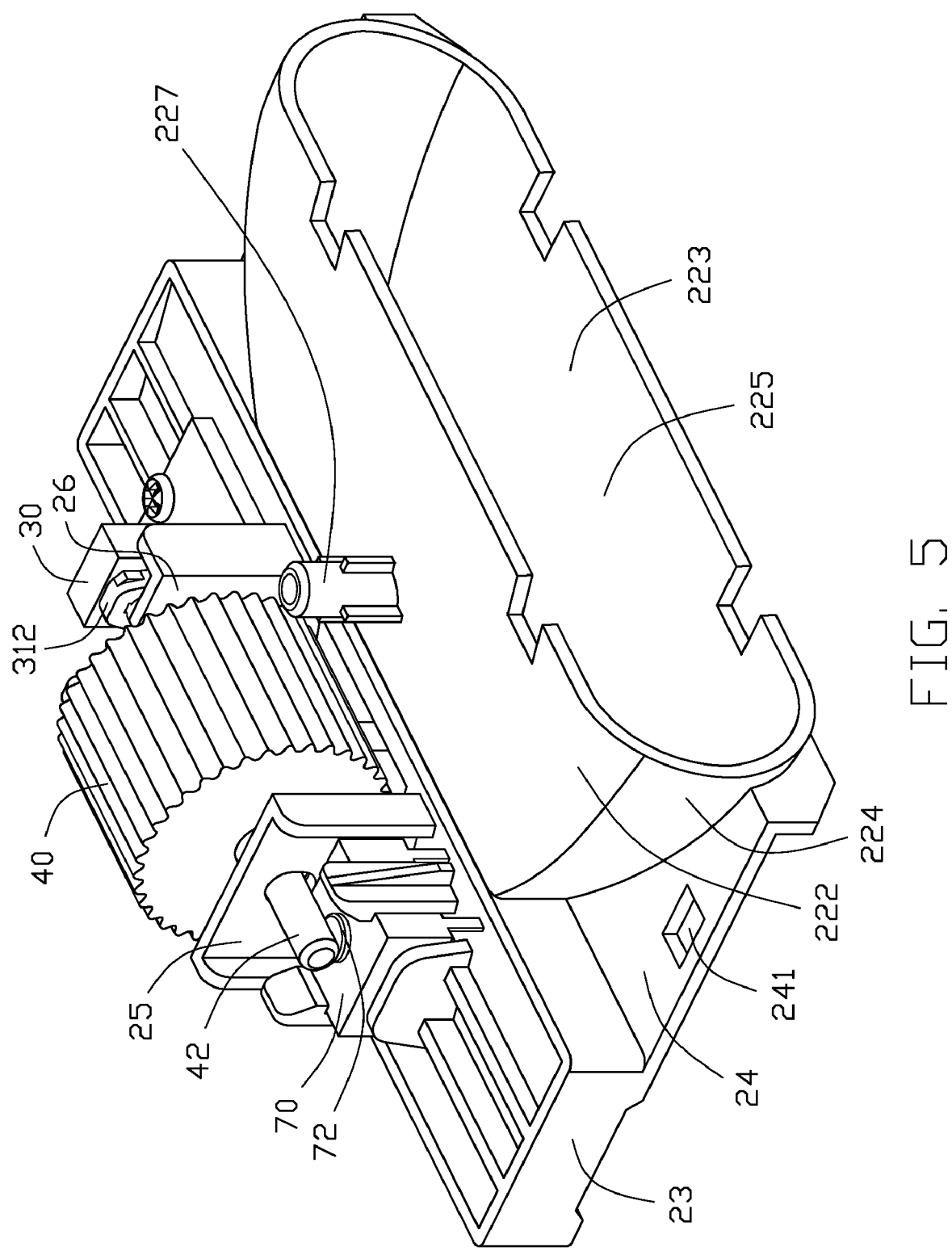
FIG. 5 is an assembled view of the switch module, the elastic member, the rotating member, the variable resistor, and the light-reflecting member of FIG. 2.
Figure 6:
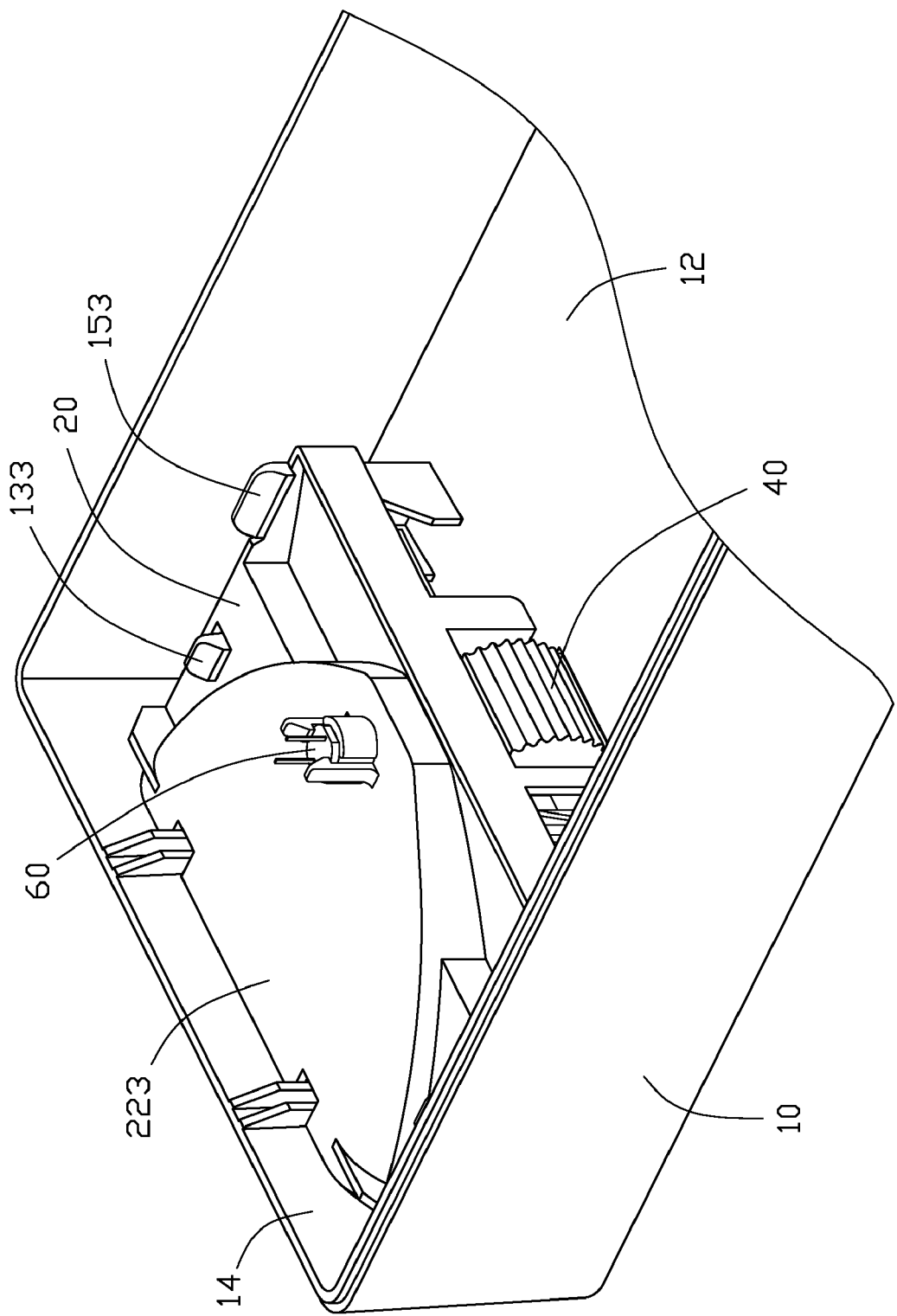
FIG. 6 is an assembled partial view of the light-adjusting mechanism.
Figure 7:
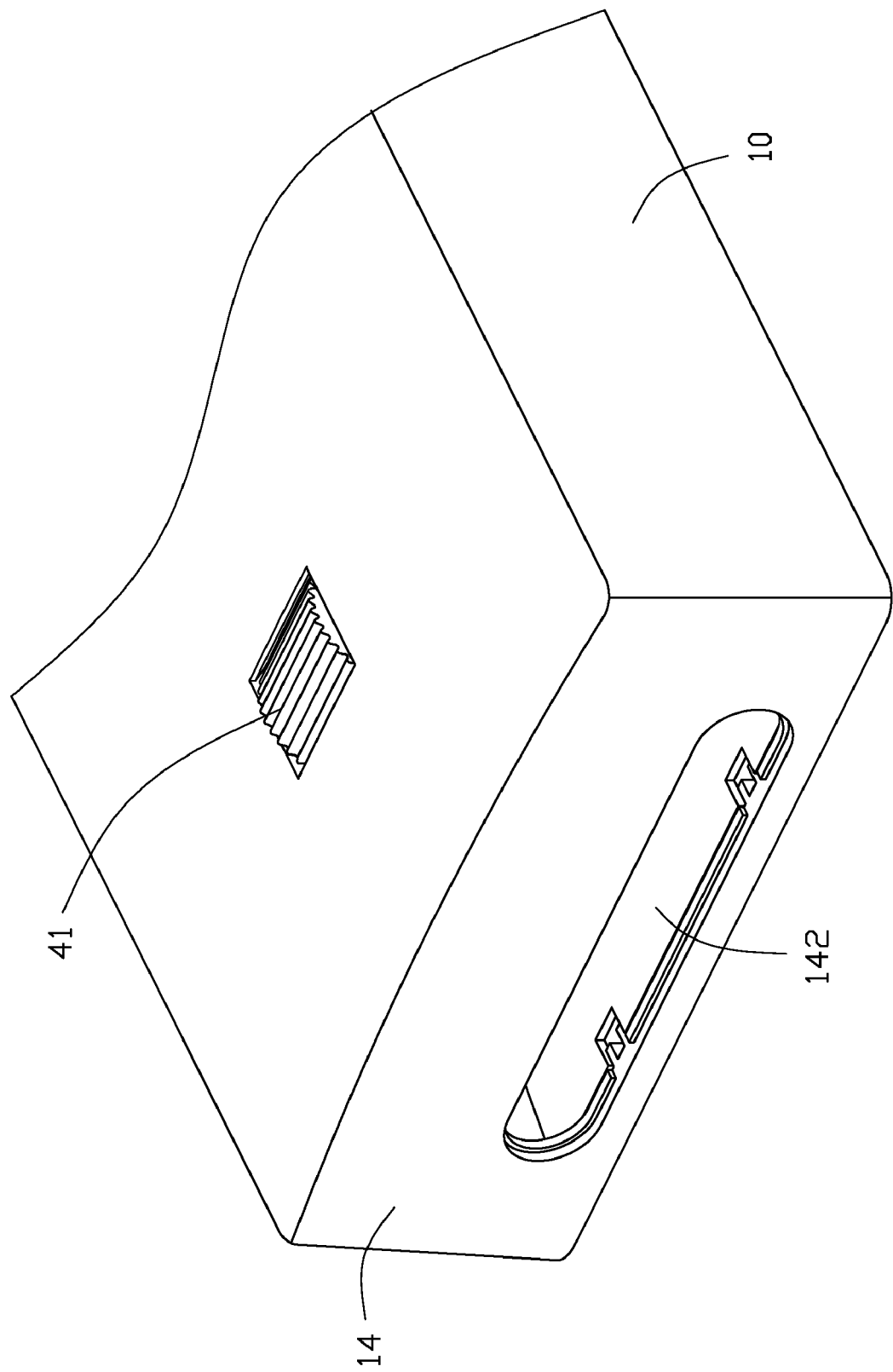
FIG. 7 is similar to FIG. 6, but viewed from another aspect.

Referring also to FIGS. 2 and 3, the variable resistor 30 includes a main body 31 and a securing panel 32. The main body 31 includes a pivoting portion 312. In the present embodiment, the pivoting portion 312 can be rotated so as to adjust a resistance of the variable resistor 30. The pivoting portion 312 defines a cross-shaped slot 314 corresponding to the crosshead 442 of the rotating member 40. The pivoting portion 312 can be rotated to change the value of the resistance of the variable resistor 30. A pair of openings 324 corresponding to the pair of L-shaped protrusions 264 respectively is defined at one side of the securing panel 32. A screw opening 332 corresponding to the screw hole 28 of the light-reflecting member 20 is defined at the opposite side of the securing panel 32.

Referring also to FIGS. 4 to 7, in assembly, the inserting portions 542 of the elastic member 50 are inserted into the corresponding positioning holes 258 of the positioning posts 256 respectively. The switch module 70 is secured on the light-reflecting member 20 by the corresponding hooks thereof. The switch module 70 is connected with the light source 60, for selectively connecting the light source to a power supply. In the exemplary embodiment, the switch module 70 is further used for controlling power-on and power-off of the computer system. The small portion of the pivot 42 of the rotating member 40 passes through the pivoting hole 252 of the tab 25 and abuts on a switch head 72 of the switch module 70. The greater portion of the pivot 42 of the rotating member 40 abuts on the supporting portion 52 of the elastic member 50. The small portion of the pivot 44 of the rotating member 40 passes through the U-shaped opening 262. The variable resistor 30 is pushed to the tab 26 until the crosshead 442 of the rotating member 40 is inserted into the slot 314 of the variable resistor 30. At this time, the openings 324 are engaged with the L-shaped protrusions 264 of the light-reflecting member 20 respectively. The through opening 225 of the light-reflecting member 20 is adjacent to the transparent board 20. Then the light-reflecting member 20 is pushed toward the base 12, until the mounting post 227 is inserted into the positioning hole 128 of the positioning post 126. The clasps 133 of the elongated hooks 13 are inserted through the locking holes 241 of the extending clips 24, and engage with the extending clips 24 respectively. The clasps 153 of the elongated hooks 15 are engaged with the locking openings 27 of the securing portions 23 respectively. The light-reflecting member 20 is thus secured on the computer panel 10. The light source 60 is secured on the light-reflecting member 20. The light source 60 electrically connects with the variable resistor 30 in series and the computer system for receiving power. The rotating body 41 of the rotating member 40 is received in the receiving hole 122 of the computer panel 10 and exposed outside. The through opening 225 of the light-reflecting member 20 is aligned with the transparent board 142 of the computer panel 10.

In use, when the computer system is switched on, the light source 60 is accordingly switched on and emits light. Some rays of the light source 60 shine on the transparent board 142 through the through opening 225 of the light-reflecting member 20 and the rotating body 41 of the rotating member 40. Thus, the rotating body 41 and the transparent board 20 are both illuminated, thereby rendering a beautiful effect when the computer system is on. If users don't want the transparent board 20 to be illuminated, the rotating body 41 of the rotating member 40 can be rotated to increase resistance of the variable resistor 30 and darken the light source 60. In addition, the rotary member 40 can function as a power button. In use, the rotating body 41 is pressed from the outside of the panel 10. Thereby, the small portion of the pivot 42 of the rotary member 40 presses the switch head 72 of the switch module 70 to trigger the switch module 70 to turn on/off the computer. At this time, the supporting portion 52 of the elastic member 50 is pushed by the pivots 42 of the rotating member 40 and causes the resilient distortion. When the rotary member 40 is released, the supporting portion 52 of the elastic member 50 will restore to drive the light-reflecting member 30 moving up. Then the rotary member 40 is moved outwardly relative to the panel and returns to its original position.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A panel assembly comprising:

a panel having a light-pervious area;

a light source attached on the panel for lighting the light-pervious area;

a variable resistor electrically connected in series with the light source;

a switch module for turning on/off a computer;

a rotating member rotatably attached on the panel, the rotating member being engagingly coupled to the variable resistor and being manually rotatable in a manner that a resistance of the variable resistor is adjusted accordingly, wherein the rotating member comprises first and second pivots extending from two opposite sides thereof respectively; each pivot comprises a greater portion and a smaller portion extending from the greater portion; the panel assembly comprises first and second tabs formed thereon with a pair of pivoting holes defined therein, and the pivoting holes correspond to the first and second pivots; the rotating member being pivotably mounted between the first and second tabs, and being inwardly movable relative to the panel in a manner such that the smaller portion of the first pivot of the rotating member triggers the switch module to turn on/off the computer; and an elastic member mounted in positioning posts protruding from one of the first and second tabs; the greater portion of the second pivot abuts the elastic member, and the elastic member being configured for urging the rotating member to move outwardly relative to the panel.

2. The panel assembly as described in claim 1, wherein a protrusion is formed at a distal end of the second pivot, and a slot is formed in the pivoting portion of the variable resistor, engaging with the protrusion.

3. The panel assembly as described in claim 2, wherein the protrusion is a crosshead, and the slot is correspondingly in a cross shape.

4. The panel assembly as described in claim 1, wherein the smaller portion being inserted in the corresponding pivoting hole.

5. The panel assembly as described in claim 1, wherein the switch module is attached on a side of the first tab.

6. The panel assembly as described in claim 5, wherein the elastic member is adjacent to the first tab.

7. The panel assembly as described in claim 1, further comprising a light-reflecting member mounted to the panel, the light-reflecting member defining an opening facing the light-pervious area, for reflecting light rays from the light source to the light-pervious area through the opening thereof.

8. The panel assembly as described in claim 1, wherein the panel has a receiving hole defined therein, the rotating member being exposed to an outside of the panel through the receiving hole.

9. A panel assembly comprising:

a panel having a light-pervious area;

a light source attached on the panel for lighting the light-pervious area, the light source being arranged at an inner side of the panel;

a switch connected to the light source for selectively connecting the light source to a power supply;

a variable resistor electrically connected in series with the light source;

an adjusting member attached on the panel and exposed to an outer side of the panel, the adjusting member being inwardly movable relative to the panel for triggering the switch, the adjusting member being engagingly coupled to the variable resistor and manually rotatable such that a resistance of the variable resistor is adjusted, wherein the adjusting member comprises first and second pivots extending from two opposite sides thereof respectively, each pivot comprises a greater portion and a smaller portion extending from the greater portion; the panel assembly comprises first and second tabs formed thereon, the first tab defines a pivoting hole thereon corresponding to the first pivot, the second tab defines an opening thereon corresponding to the second pivot; the adjusting member is pivotably mounted between the first and second tabs and inwardly movable relative to the panel, in a manner such that the smaller portion of the first pivot of the adjusting member is capable of triggering the switch to turn on/off the light source; and an elastic member mounted in positioning posts protruding from one of the first and second tabs; the greater portion of the second pivot abuts the elastic member, and the elastic member being configured for urging the adjusting member to move outward relative to the panel.

10. The panel assembly as described in claim 9, wherein the adjusting portion is engaged with the second pivot.

11. The panel assembly as described in claim 10, wherein a protrusion is formed at a distal end of the first pivot, and a slot is formed in the pivoting portion that engages the protrusion.

12. The panel assembly as described in claim 11, wherein the protrusion has a cross shape, and the slot has a shape that corresponds to the protrusion.

13. The panel assembly as described in claim 9, wherein the smaller portion being inserted in the corresponding pivoting hole.

14. The panel assembly as described in claim 13, wherein the switch is attached on a side of the first tab.

15. The panel assembly as described in claim 14, wherein the elastic member is adjacent to the first tab.

16. The panel assembly as described in claim 1, wherein the variable resistor comprises a pivoting portion formed thereon; the pivoting portion is capable of engaging the first pivot of the rotating member.

17. The panel assembly as described in claim 9, wherein the variable resistor has an adjusting portion coupled to the adjusting member, and the adjusting portion is rotatable by the adjusting member and capable of adjusting the resistance of the variable resistor.

\* \* \* \* \*